United States Patent
Janse et al.

(10) Patent No.: US 9,225,842 B2
(45) Date of Patent: Dec. 29, 2015

(54) DETERMINING AN ACOUSTIC COUPLING BETWEEN A FAR-END TALKER SIGNAL AND A COMBINED SIGNAL

(75) Inventors: Cornelis Pieter Janse, Eindhoven (NL); Leon C. A. Van Stuivenberg, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 836 days.

(21) Appl. No.: 13/141,114

(22) PCT Filed: Dec. 15, 2009

(86) PCT No.: PCT/IB2009/055755
§ 371 (c)(1),
(2), (4) Date: Jun. 21, 2011

(87) PCT Pub. No.: WO2010/073181
PCT Pub. Date: Jul. 1, 2010

(65) Prior Publication Data
US 2011/0255703 A1 Oct. 20, 2011

(30) Foreign Application Priority Data
Dec. 22, 2008 (EP) .................................. 08172546

(51) Int. Cl.
*H04R 3/02* (2006.01)
*H04M 9/08* (2006.01)

(52) U.S. Cl.
CPC ..................................... *H04M 9/082* (2013.01)

(58) Field of Classification Search
USPC ................... 381/93, 95, 96, 63, 66, 71.11
See application file for complete search history.

(56) References Cited

U.S. PATENT DOCUMENTS

| | | | | |
|---|---|---|---|---|
| 6,126,608 | A * | 10/2000 | Kemme et al. | 600/459 |
| 6,556,682 | B1 * | 4/2003 | Gilloire et al. | 381/66 |
| 6,625,279 | B1 | 9/2003 | Eom | |
| 7,386,120 | B2 | 6/2008 | Rayala | |
| 7,450,528 | B1 * | 11/2008 | DellaMorte et al. | 370/286 |

(Continued)

FOREIGN PATENT DOCUMENTS

| | | |
|---|---|---|
| CN | 101292508 A | 10/2008 |
| FR | 2674389 A1 | 9/1992 |

(Continued)

OTHER PUBLICATIONS

Haykin, S.: "Adaptive Filter Theory"; Prentice Hall Publishers, 1986, pp. 432-437.
Egelmeers, G.: "Real Time Realization Concepts of Large Adaptive Filters"; PhD Thesis, Eindhoven University of Technology, Eindhoven, The Netherlands, 1995, 215 Page Document.

(Continued)

*Primary Examiner* — Duc Nguyen
*Assistant Examiner* — George Monikang

(57) ABSTRACT

An improved determination of an acoustic coupling between a loudspeaker and a microphone, which results in a better estimate of the acoustic coupling during double talk, is achieved in a device for determining an acoustic coupling between a far-end talker signal as produced by the loudspeaker and a combined signal as picked up by the microphone. The combined signal comprises an echo of the far-end talker signal and a near-end talker signal. The acoustic coupling is derived from a ratio of changes in an envelope of the combined signal to changes in the envelope of the far-end talker signal in a predetermined time interval. In this way, a systematic error during double talk is strongly reduced.

12 Claims, 6 Drawing Sheets

(56) References Cited

U.S. PATENT DOCUMENTS

| | | | |
|---|---|---|---|
| 8,116,459 B2* | 2/2012 | Disch et al. | 381/22 |
| 8,311,234 B2* | 11/2012 | Sakuraba | 381/66 |
| 2003/0076172 A1* | 4/2003 | Tichauer | 330/285 |
| 2004/0057574 A1 | 3/2004 | Faller | |
| 2004/0062386 A1* | 4/2004 | Tahernezhaadi et al. | 379/406.01 |
| 2004/0091099 A1* | 5/2004 | Akie | 379/406.01 |
| 2004/0247111 A1* | 12/2004 | Popovic et al. | 379/406.01 |
| 2008/0118075 A1 | 5/2008 | Benesty et al. | |
| 2008/0219431 A1* | 9/2008 | Liu et al. | 379/406.01 |

FOREIGN PATENT DOCUMENTS

| | | |
|---|---|---|
| JP | 8256089 A | 10/1996 |
| JP | 9055687 A | 2/1997 |
| JP | 2003324370 A | 11/2003 |
| JP | 2006148375 A | 6/2006 |
| JP | 2006279191 A | 10/2006 |
| WO | 9749196 A2 | 12/1997 |
| WO | 2007046070 A1 | 4/2007 |

OTHER PUBLICATIONS

Derkx et al: "Robust Adaptive Filters for Acoustic Echo Cancellation"; Nat. Lab. Technical Note 2001/398, Dec. 2001, 50 Page Document.

Favrot et al: "Acoustic Echo Control Based on Temporal Fluctuations of Short-Time Spectra"; Proc. Int. Works on Acoust Echo and Noise Control, 2008, pp. 2-5.

Faller et al: "Suppressing Acoustic Echo in a Spectral Envelope Space"; IEEE Transactions on Speech and Audio Processing, Vol. 13, No. 5, Sep. 2005, pp. 1048-1062.

Yukawa et al: "Efficient Acoustic Echo Cancellation With Reduced-Rank Adaptive Filtering Based on Selective Decimation and Adaptive Interpolation"; IEEE Transactions on Audio, Speech, and Language Processing, vol. 16, No. 4, May 2008, pp. 696-710.

Madhu et al: "An EM-Based Probabilistic Approach for Acoustic Echo Suppression"; IEEE 2008, pp. 265-268.

Mader et al: "Step-Size Control for Acoustic Echo Cancellation Filters—An Overview"; Signal Processing 80 (2000), pp. 1697-1719.

* cited by examiner

DETERMINING AN ACOUSTIC COUPLING BETWEEN A FAR-END TALKER SIGNAL AND A COMBINED SIGNAL

FIELD OF THE INVENTION

The invention relates to a device for determining an acoustic coupling between a far-end talker signal and a combined signal that comprises an echo of the far-end talker signal and a near-end talker signal. The invention also relates to a method for determining an acoustic coupling between a far-end talker signal and a combined signal. Furthermore, the invention relates to an acoustic echo canceller, a webcam device, a video conferencing system, and hands-free telephone terminal.

BACKGROUND OF THE INVENTION

In full-duplex hands-free communication system nowadays always Acoustic Echo Cancellers (AECs) are used. A crucial component of such an AEC is an adaptive filter, often referred to as an echo filter that models a physical path between a loudspeaker and a microphone and tries to predict an echo on the microphone caused by the loudspeaker. A signal of a far-end talker on the opposite side is amplified and fed to the loudspeaker. The echo is generated and picked up by the microphone together with the speech signal of a near-end talker, if present. The adaptive filter makes a replica of the echo signal, which can be subtracted from the microphone signal. This is done by estimating (a part of) the impulse response between the loudspeaker and the microphone.

The adaptive filter, typically implemented as an N-point transversal filter, updates its coefficients by correlating the residual signal, which is a difference between the microphone signal and the replica of the echo signal, with the input data of the transversal filter. However, this works well if only the echo is present. If also the near-end talker signal is present, then problems can occur, since the adaptive filter will diverge due to the presence of the near-end talker signal. If the far-end talker signal and the near-end talker signal are correlated these problems are more severe. A solution to this problem is to reduce the amount of adaptation in case of double talk and in case of severe double talk even to stop the adaptation. A well-known solution is to use step-size control like e.g. given in A. Mader, H. Puder and G. U. Schmidt, "Step-size control for acoustic echo cancellation filters—an overview", Signal processing 80 (2000) pp. 1697-1719.
The updates of coefficients of the adaptive filter are then dependent on the acoustic coupling such that the step-size of the adaptive filter decreases once a near-end speaker becomes active. The acoustic coupling is then estimated as the ratio of powers of the far-end talker signal to the microphone signal. However, for double talk situations this acoustic coupling is estimated too large, such that the decrease in the step-size of the adaptive filter becomes too small and the adaptive filter diverges from its optimum solution.

SUMMARY OF THE INVENTION

It is an object of the present invention to provide an improved determination of an acoustic coupling between a far-end talker signal and a combined signal, which results in a better estimate of the acoustic coupling during double talk. The invention is defined by the independent claims. The dependent claims define advantageous embodiments.

According to the present invention, this object is achieved in that the acoustic coupling is derived from a ratio of changes in an envelope of the combined signal to changes in an envelope of the far-end talker signal in a predetermined time interval. In this way the systematic error during double talk (an estimation of the acoustic coupling that is too large) is not present anymore or at least strongly reduced.

In a further embodiment, the envelope of the combined signal and the envelope of the far-end talker signal are obtained from the combined signal by rectifying and averaging on a block basis and the far-end talker signal by rectifying and averaging on the block basis, respectively. This method is advantageous for signals with a slow-varying envelope like e.g. speech.

In a further embodiment, the envelope of the combined signal and the envelope of the far-end talker signal are derived from a power measurement for the combined signal and the far-end talker signal, respectively, on a block basis. This method is advantageous for signals with a slow-varying envelope like e.g. speech, and can be implemented very efficiently on certain DSP platforms.

In a further embodiment, the predetermined time interval is a time interval between successive samples of the far-end talker signal, wherein sampling of the combined signal is aligned with sampling of the far-end talker signal. The alignment of the sampling of the combined signal with the far-end talker signal is necessary since the echo at the microphone can be considered as a linear convolution of the loudspeaker signal with the acoustic path that is a function of the acoustic coupling.

In a further embodiment, the predetermined time interval comprises a multiplicity of a time interval between the successive samples of the far-end talker signal, wherein sampling of the combined signal is aligned with sampling of the far-end talker signal. In this way the acoustic coupling can be determined on a block basis (i.e. blocks of samples). This allows to make an update of the acoustic coupling only once per block and thus provides computational reduction.

In a further embodiment, the device comprises:
a first changes-in-envelope determining circuit for determining the changes in the envelope of the far-end talker signal,
a second changes-in-envelope determining circuit for determining the changes in the envelope of the combined signal,
an adaptive filter for filtering the changes in the envelope of the far-end talker signal, wherein the adaptive filter is controlled by a residual signal, wherein one of coefficients of the adaptive filter is the ratio of the changes in an envelope of the combined signal to the changes in the envelope of the far-end talker signal in the predetermined time interval, and
a subtraction circuit for determining the residual signal being a difference between the output signal of the adaptive filter and the changes in the envelope of the combined signal. The advantage of using the adaptive filter is that with such a (simple) adaptive filter a robust estimate of the acoustic path can be obtained.

In a further embodiment, the adaptive filter is a multi-tap filter, wherein the ratio of changes in the envelope of the combined signal to changes in the envelope of the far-end talker signal in the predetermined time interval is determined as a coefficient of the adaptive filter having a largest value.

In a further embodiment, a delay between a far-end talker signal and the echo of a far-end talker signal is determined by a location of a tap with a largest value of the adaptive filter that determines the acoustic coupling. In this way the bulk delay that is sometimes present in certain applications can be estimated. This is for example the case in digital TV sets, where the audio is delayed in order to be synchronized with a video.

According to another aspect of the invention there is provided a method for determining an acoustic coupling between a far-end talker signal and a combined signal. It should be appreciated that the features, advantages, comments, etc. described above are equally applicable to this aspect of the invention.

The invention further provides an acoustic echo canceller, a webcam device, a video-conferencing system, and a hands-free telephone terminal comprising a device according to the invention.

These and other aspects, features and advantages of the invention will be apparent from and elucidated with reference to the embodiment(s) described hereinafter.

DETAILED DESCRIPTION OF EMBODIMENTS OF THE PRESENT INVENTION

Figure 1:
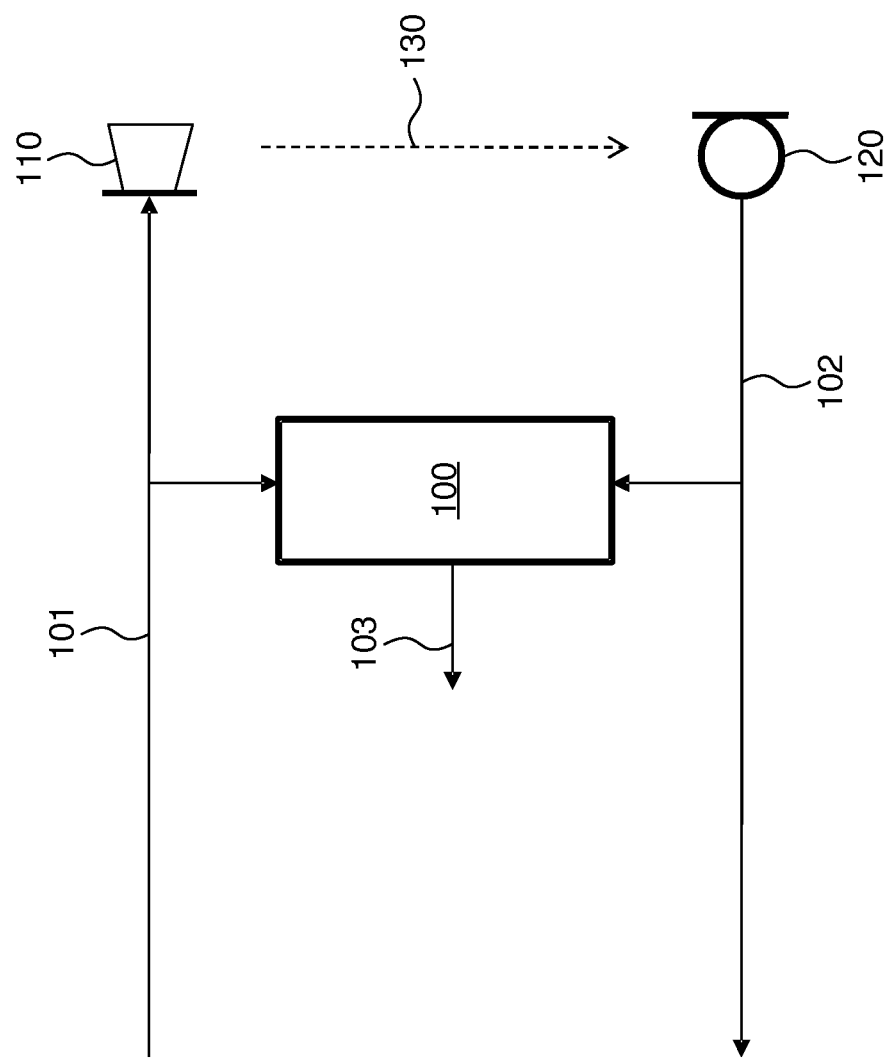
FIG. 1 shows schematically an embodiment of a device for determining an acoustic coupling according to the invention between a loudspeaker and a microphone.

FIG. 1 shows schematically an embodiment of a device 100 for determining an acoustic coupling 103 according to the invention between a loudspeaker 110 and a microphone 120. The loudspeaker 110 is reproducing the far-end talker signal 101. The microphone 120 is picking-up a combined signal 102 comprising an echo of the far-end talker signal 101 and a near-end talker signal. The acoustic coupling phenomenon between the loudspeaker 110 and the microphone 120 is symbolically depicted by the arrow 130. The acoustic coupling 103 is derived from a ratio of changes in an envelope of the combined signal 102 to changes in the envelope of the far-end talker signal 101 in a predetermined time interval. The derived acoustic coupling is outputted by the device 100 in the form of a signal 103.

Figure 2:
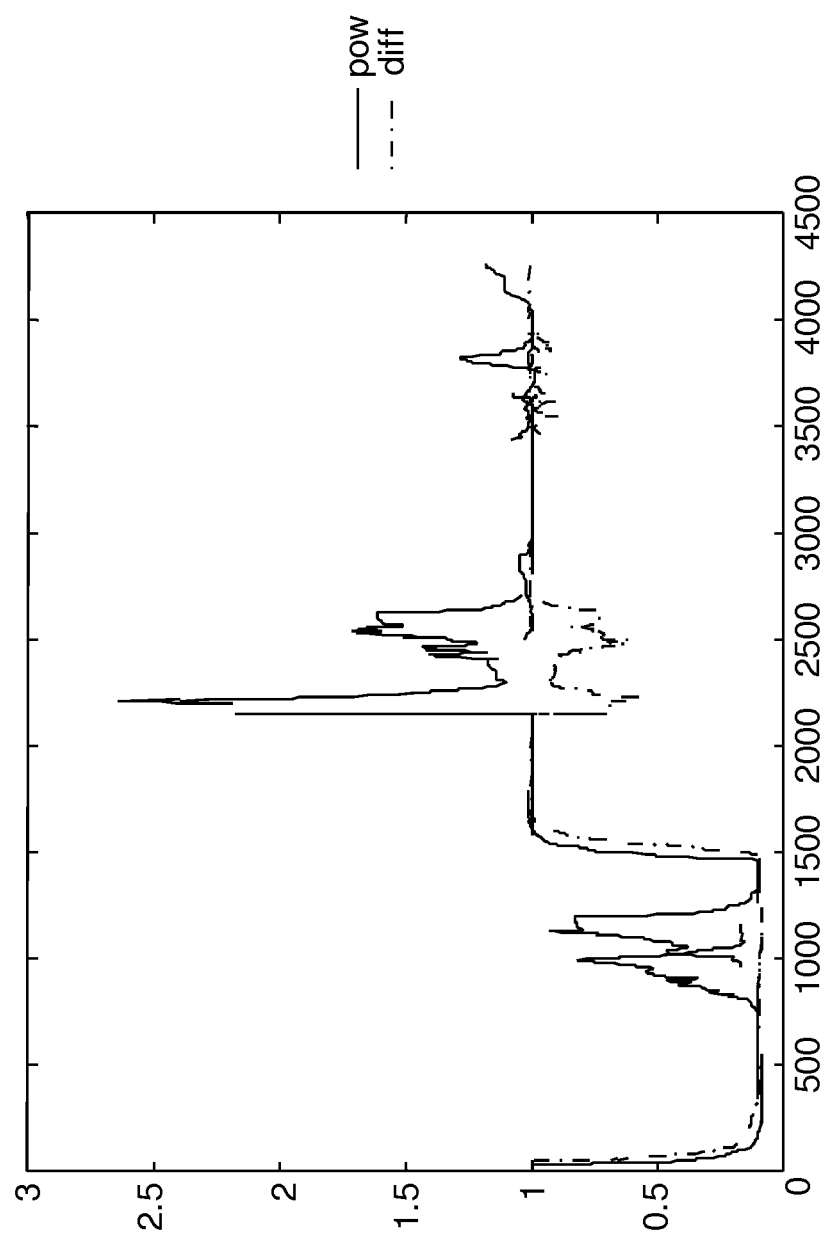
FIG. 2 shows a plot that illustrates an effect of deriving an acoustic coupling from a ratio of changes in an envelope of the combined signal to changes in the envelope of the far-end talker signal in a predetermined time interval.

FIG. 2 shows a plot that illustrates an effect of deriving the acoustic coupling 103 from the ratio of the changes in the envelope of the combined signal 102 to the changes in the envelope of the far-end talker signal 101 in the predetermined time interval. An x-axis depicts a time in terms of blocks of signal samples. A y-axis depicts the square root of the acoustic coupling. A solid line plot shows the square root of the acoustic coupling, wherein the acoustic coupling is derived as the square root of the ratio of the power of the combined signal 102 to the power of the far-end talker signal 101 in the predetermined time interval. A dashed line plot shows the square root of the acoustic coupling, wherein the acoustic coupling is derived as the ratio of the changes in the envelope of the combined signal 102 to the changes in the envelope of the far-end talker signal 101 in the predetermined time interval. In the depicted period there is (almost) continuous far-end speech present in the far-end talker signal 101. This period is split into two sub-periods, where a first sub-period is in a range of 1 to 1400 blocks, where each block corresponds to 80 samples, and a second sub-period is in the range 1400 to 4500 blocks. The square root of the acoustic coupling 103 in the first sub-period takes a value of about 0.1, while in the second sub-period takes the value of about 1. There is a double talk in the sub-ranges between 700 and 1200 blocks, between 2100 and 2600 blocks, and between 3400 and 4000 blocks. A level of a near-end speech comprised in the near-end talker signal during the first two sub-periods is about the same as the level of the far-end speech signal comprised in the far-end talker signal whereas during the third sub-period the near-end speech signal comprised in the near-end talker signal is about 20 dB lower than the far-end speech signal. The square root of the acoustic coupling depicted by the solid line is correct only for periods when no double talk is present. For the acoustic coupling determined according to the invention and its square root depicted by the dashed line there is almost no deviation during the double talk in the sub-period between 700 and 1200 blocks, whereas for the sub-periods in the blocks between 2100 and 2600 blocks, and between 3400 and 4000 blocks the deviation is smaller than this exhibited by the solid line plot. Even more importantly, the deviation has an opposite direction. This could in other words be expressed as underestimating of the acoustic coupling in these sub-periods. During the double talk there are two talkers active simultaneously and, especially when they both are equally strong as they are in the sub-period of 2100 to 2600 blocks, the deviation of the envelope of the combined signal 102 is smaller than the envelope of the individual components of the echo and the near-end speech. Such underestimating is actually desired as it leads to slower adaptation of the adaptive filter during double talk, which is what we want.

Figure 3:
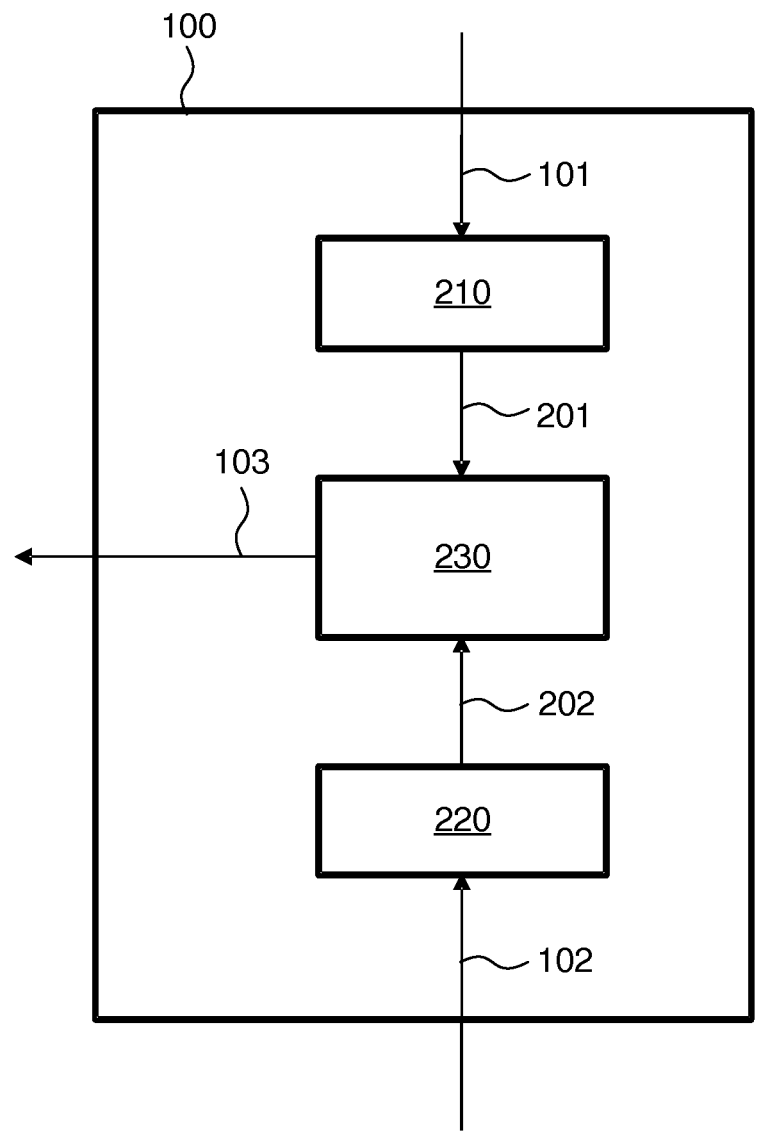
FIG. 3 shows an example architecture of the device for determining an acoustic coupling according to the invention.

FIG. 3 shows an example architecture of the device 100 for determining an acoustic coupling 103 according to the invention. The device 100 comprises a first envelope determining circuit 210 for determining a first envelope 201 of the far-end talker signal 101 and a second envelope determining circuit 220 for determining a second envelope 202 of the combined signal 102. Further, the device 100 comprises a difference circuit 230 to which the envelopes 201 and 202 derived by the circuits 210 and 220 are provided. The difference circuit 230 determines the acoustic coupling 103, which is derived from a ratio of changes in the first envelope 201 to changes in the second envelope 202 in a predetermined time interval.

In an embodiment, the envelope of the signal as obtained in the first envelope determining circuit 210 and the second envelope determining circuit 220 is determined by rectifying (i.e. taking the absolute value of the signal) and low-pass filtering the signals 101 and 102, respectively, with a low-pass filter with a cut-off frequency of 100 Hz for example.

In a further embodiment, the envelope of the signal as obtained in the first envelope determining circuit 210 and the second envelope determining circuit 220 is obtained from an average rectified combined signal on a block basis and an average rectified far-end talker signal on the block basis, respectively. The size of a block is determined by the (average) change in the speech envelope and is for example 160 samples at a sampling frequency of 16 kHz. For a signal x the envelope $x_e$ obtained from the average rectified signal on block basis can be expressed as:

$$x_e[k] = \Sigma_{m=0}^{B-1} |x[k-m]|,$$

where $x_e[k]$ denotes an envelope value for the k-th block, and B is the block size expressed in terms of a number of samples.

In a further embodiment, the envelope of the combined signal 201 and the envelope of the far-end talker signal 202 are derived from a power measurement on a block basis. One way to calculate the envelope of a signal is to take the square root of the power the signal on block basis. For a signal x the envelope $x_e$ can then be expressed as:

$$x_e[k] = \sqrt{\sum_{m=0}^{B-1} x[k-m]^2}.$$

In a further embodiment, the changes in an envelope are the differences of the envelope at a beginning and at an end of the predetermined time interval. For the signal x the change in the envelope of this signal $\Delta_{x_e}$ over the time interval delimited by samples (k−D) and k can then be expressed as:

$$\Delta_{x_e}[k] = x_e[k] - x_e[k-D],$$

where D is the length of the predetermined time interval. Similarly, the index k could indicate the block number, while D the length of the predetermined time interval expressed in terms of a number of blocks.

The time intervals over which the acoustic coupling is determined are adjacent to each other. However, these intervals could also overlap.

In a further embodiment, the changes in an envelope are estimated by high-pass filtering the envelope signal with a zero-DC filter.

In a further embodiment, the predetermined time interval is the time interval between the successive samples of the far-end talker signal 101, wherein sampling of the combined signal 102 is aligned with the sampling of the far-end talker signal 101. For the signal x the change in the envelope of this signal $\Delta_{x_e}$ between the successive samples k and (k+1) can then be expressed as:

$$\Delta_{x_e}[k+1] = x_e[k+1] - x_e[k],$$

where $x_e[k]$ denotes an envelope value for the k-th sample.

In a further embodiment, the predetermined time interval is the time interval comprising a multiplicity of the time interval between the successive samples of the far-end talker signal, wherein sampling of the combined signal 102 is aligned with the sampling of the far-end talker signal 101. The size of a block is determined by the (average) change in the speech envelope and is for example 160 samples at a sampling frequency of 16 kHz. For the signal x the change in the envelope of this signal $\Delta_{x_e}$ can then be expressed as:

$$\Delta_{x_e}[(l+1)B] = x_e[(l+1)B] - x_e[lB],$$

where B denotes the block size expressed in the number of samples.

Figure 4:
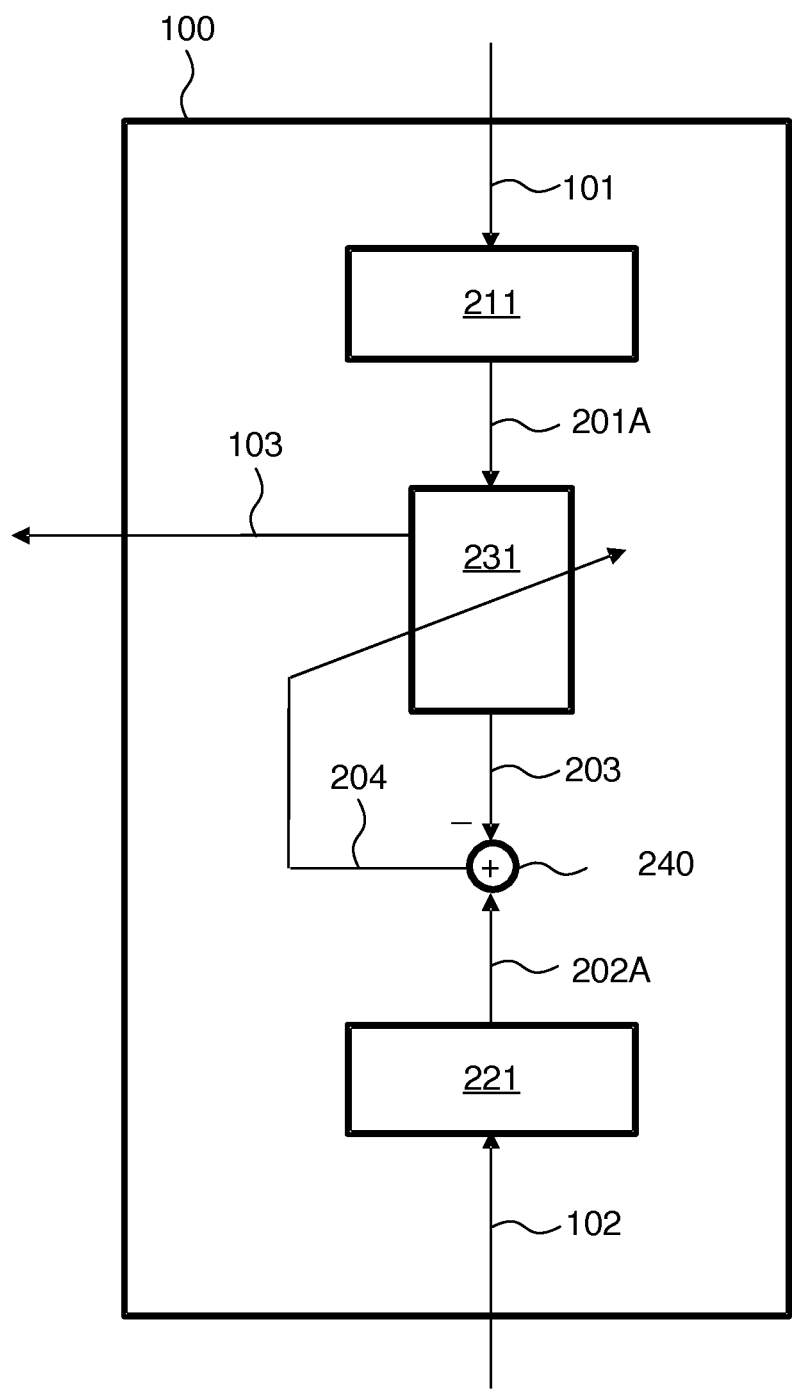
FIG. 4 shows an alternative embodiment of the device for determining an acoustic coupling comprising an adaptive filter.

FIG. 4 shows an alternative embodiment of the device 100 for determining an acoustic coupling 103 comprising an adaptive filter 231. The device 100 comprises a first changes-in-envelope determining circuit 211 for determining the first changes of the envelope 201A of the far-end talker signal 101 and a second changes-in-envelope determining circuit 221 for determining the second changes of the envelope 202A of the combined signal 102. Further, the device 100 comprises the adaptive filter 231 for filtering an output signal of the first changes-in-envelope determining circuit 211, wherein the adaptive filter 231 is controlled by a residual signal 204. One of coefficients of the adaptive filter 231 represents the ratio of changes in the envelope 202A of the combined signal 102 to changes in the changes in the envelope 201A of the far-end talker signal 101 in a predetermined time interval. The residual signal 204 is provided by a subtraction circuit 240 that calculates a difference between the output signal of the adaptive filter 231 and the output signal 202A of the second changes-in-envelope determining circuit 221.

The envelope determining circuits 211 and 221 determine the changes of the envelope of the far-end signal and near-end signal respectively, according to one of the methods described above.

The adaptive filter 231 adjusts its coefficients in such a way that the energy of the residual signal 204 is minimized. For the adaptation of the filter a Normalized Least Mean Square (NLMS) filter, as described in S. Haykin, Adaptive Filter Theory, Englewood Cliffs (NJ, USA): Prentice-Hall, 1986, ISBN 0-13-004052-5 025, can be used. Alternatively, instead of the NLMS filter a Block Frequency Domain Adaptive Filter or a Partitioned Domain Adaptive Filter, as described in G. P. M. Egelmeers, Real time realization concepts of large adaptive filters, PhD thesis, Eindhoven University of Technology, Eindhoven, The Netherlands, Eindhoven 1995, ISBN 90-386-0456-4, can be used, which means that NLMS algorithm is applied per frequency bin. The adaptation speed of the NLMS filter depends on the spectral shape of the input power. The Block Frequency Domain Adaptive Filter or the Partitioned Domain Adaptive Filter are much less sensitive to the spectral shape of the input power.

In a further embodiment, the adaptive filter 231 is a one-tap filter. After the adaptive filter 231 has converged the estimate of the acoustic coupling 103 is derived as the square of the coefficient of the adaptive filter 231.

In a further embodiment, the adaptive filter 231 is a multi-tap filter, wherein the ratio of changes in an envelope 202A of the combined signal 102 to changes in the envelope 201A of the far-end talker signal 101 in a predetermined time interval is determined as a coefficient of the adaptive filter 231 having a largest value.

In a further embodiment, a delay between a far-end talker signal (101) and the echo of a far-end talker signal is determined by a location of a tap with a largest value of the adaptive filter (231) that determines the acoustic coupling (103).

Figure 5:
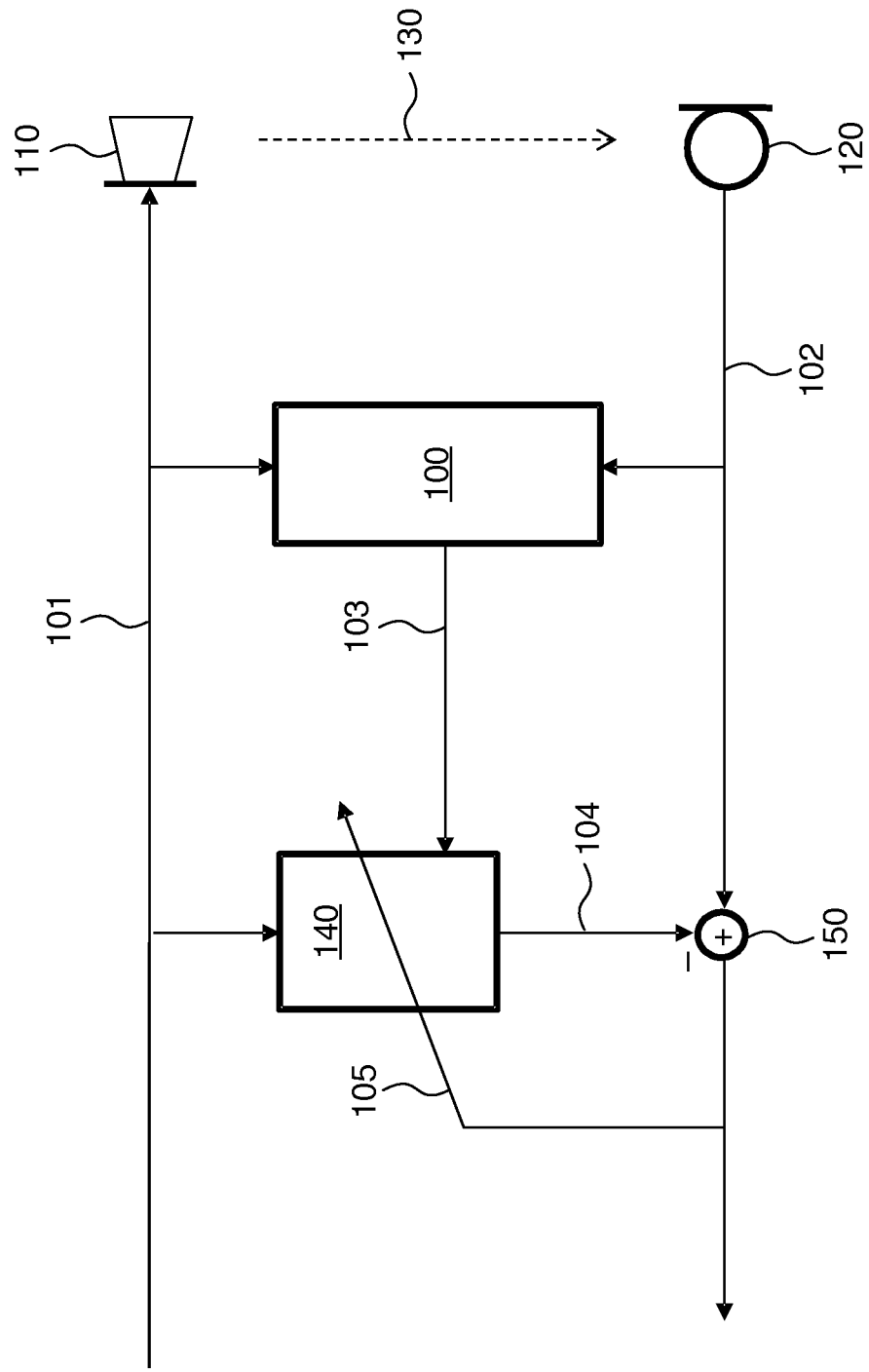
FIG. 5 shows schematically an embodiment of an acoustic echo canceller comprising the device for determining an acoustic coupling according to the invention.

FIG. 5 shows schematically an embodiment of an acoustic echo canceller comprising the device 100 for determining an acoustic coupling according to the invention. The acoustic echo canceller comprises the loudspeaker 110 reproducing the far-end talker signal 101, and the microphone 120 picking-up a combined signal 102 comprising an echo of the far-end talker signal 101 and a near-end talker signal. The acoustic echo canceller further comprises an echo filter 140, often being realized as an adaptive filter, for predicting an echo on the microphone 120 caused by the loudspeaker 110. The echo filter 140 is filtering the far-end talker signal 101 in dependence on a difference 105 between the output signal 104 of the echo filter 140 and the combined signal 102. The difference signal 105 is obtained in a further subtraction circuit 150. The acoustic echo canceller further comprises the device 100 for determining an acoustic coupling 103 between the loudspeaker 110 and a microphone 120 according to the invention. The echo filter 140 is controlled by the acoustic coupling 103. For an adaptation of the echo filter 140, for example, a Normalized Least Mean Square (NLMS) algorithm with step-size control can be used. For example the NLMS algorithm might have the following learning rule (as described in S. Haykin, Adaptive Filter Theory, Englewood Cliffs (NJ, USA): Prentice-Hall, 1986, ISBN 0-13-004052-5 025):

$$\overline{w}_{k+1} = \overline{w}_k + 2\alpha \frac{\overline{x}_k r_k}{P_{xx}},$$

where $\overline{x}_k$ is the input vector (i.e. the samples in the delay line of the N-point transversal filter of the further adaptive filter at (discrete-) time k, $\overline{w}_k$ and $\overline{w}_{k+1}$ are the vectors comprising the filter coefficients of the transversal filter at time k and k+1 respectively, $r_k$ is the further residual signal, $P_{xx}$ the smoothed power of the input signal 101, and $\alpha$ is the step-size. Applying step-size control leads, for example, to the following learning rule:

$$\overline{w}_{k+1} = \overline{w}_k + 2\alpha \frac{\overline{x}_k r_k}{\text{MAX}(P_{xx}, \gamma P_{rr})},$$

where $\gamma$ is the acoustic coupling 103 and $P_{rr}$ is the smoothed power of the further residual signal. If only far-end talker signal 101 is present, the maximum is determined by $P_{xx}$ and therefore the echo filter is converging fast. If double talk is present, $\gamma P_{rr}$ is larger than $P_{xx}$ and the adaptation speed of the echo filter is decreased.

Figure 6:
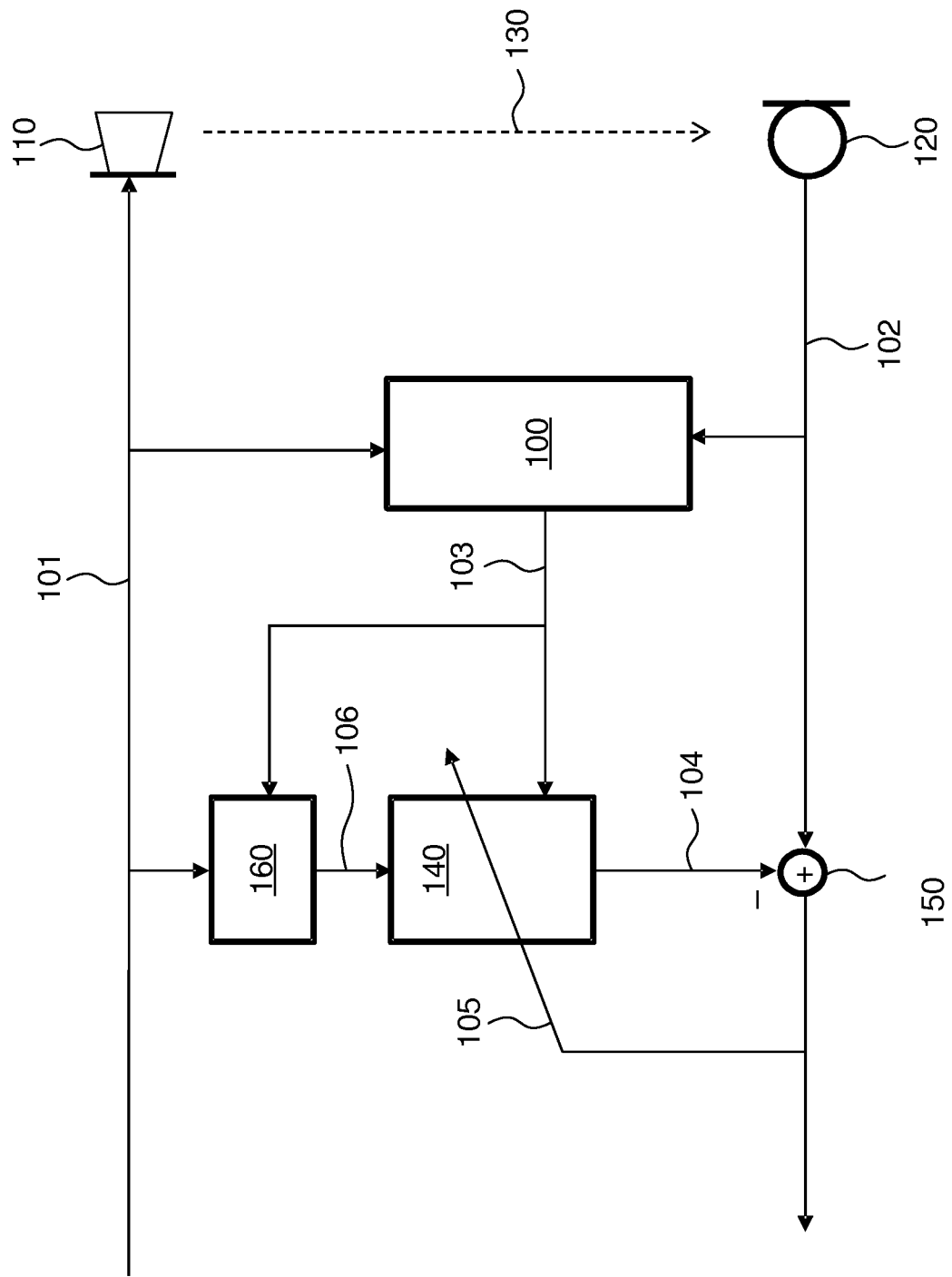
FIG. 6 shows schematically an embodiment of an acoustic echo canceller comprising a delay circuit preceding the further adaptive filter to delay the far-end talker signal, wherein the delay circuit is controlled by the acoustic coupling.

FIG. 6 shows schematically an embodiment of an acoustic echo canceller comprising a delay circuit 160 preceding the echo filter 140 to delay the far-end talker signal 101. The delay circuit 160 is controlled by the acoustic coupling 103. The functional circuits of the acoustic echo canceller that are in common with the acoustic echo canceller depicted in FIG. 5 are the same for the acoustic echo canceller depicted in FIG. 6.

The acoustic coupling determining device 100 comprises e.g. a multi-tap adaptive filter, wherein the location of a tap with the largest value in an impulse response of the multi tap adaptive filter determines the size of the bulk delay. If, for example, the peak is located at a tap n and the predetermined interval is B samples large, the bulk delay is maximally (n−1) *B samples. In practice a somewhat lower value is taken to guarantee that the adaptive filter covers the real acoustic impulse response.

The above described acoustic echo cancellers can be advantageously applied in webcam devices, video-conferencing systems or hands-free telephone terminals.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of circuits, elements or method steps may be implemented by e.g. a single unit or processor. Additionally, although individual features may be included in different claims, these may possibly be advantageously combined, and the inclusion in different claims does not imply that a combination of features is not feasible and/or advantageous. The word "comprising" does not exclude the presence of elements or steps other than those listed in a claim. Also the inclusion of a feature in one category of claims does not imply a limitation to this category but rather indicates that the feature is equally applicable to other claim categories as appropriate. In addition, singular references do not exclude a plurality. Thus references to "a", "an", "first", "second" etc. do not preclude a plurality. Reference signs in the claims are provided merely as a clarifying example and shall not be construed as limiting the scope of the claims in any way. The invention can be implemented in circuit of hardware comprising several distinct elements, and by circuit of a suitably programmed computer or other programmable device.

The invention claimed is:

1. A device for determining an acoustic coupling between a far-end talker signal and a combined signal that comprises an echo of the far-end talker signal and a near-end talker signal, the device comprising:
   inputs for receiving the far-end talker signal and the combined signal; and
   circuitry for deriving the acoustic coupling from a ratio of changes in an envelope of the combined signal to changes in an envelope of the far-end talker signal in a predetermined time interval,
   wherein the circuitry comprises an adaptive filter and a subtractor, the adaptive filter being configured to filter the changes in the envelope of the far-end talker signal, and the subtractor being configured to determine a residual signal by calculating a difference between an output signal of the adaptive filter and the changes in the envelope of the combined signal, wherein the adaptive filter is controlled by the residual signal to adjust coefficients of the adaptive filter in such a way that an energy of the residual signal is minimized, and wherein the residual signal is provided to the adaptive filter for adjusting the coefficients of the adaptive filter, and
   wherein the circuitry further comprises a first changes-in-envelope determining circuit for determining changes in the envelope of the far-end talker signal and a second changes-in-envelope determining circuit for determining changes in the envelope of the combined signal.

2. The device as claimed in claim 1, wherein the envelope of the combined signal and the envelope of the far-end talker signal are obtained from the combined signal by rectifying and averaging on a block basis and the far-end talker signal by rectifying and averaging on the block basis, respectively.

3. The device as claimed in claim 1, wherein the predetermined time interval is a time interval between successive samples of the far-end talker signal, wherein sampling of the combined signal is aligned with sampling of the far-end talker signal.

4. The device as claimed in claim 1, wherein the predetermined time interval comprises a multiplicity of a time interval between successive samples of the far-end talker signal, wherein sampling of the combined signal is aligned with sampling of the far-end talker signal.

5. The device as claimed in claim 1, wherein a coefficient of the adaptive filter is the ratio of the changes in the envelope of the combined signal to the changes in the envelope of the far-end talker signal in the predetermined time interval.

6. The device as claimed in claim 5, wherein the adaptive filter is a multi-tap filter, wherein the ratio of the changes in the envelope of the combined signal to the changes in the envelope of the far-end talker signal in the predetermined time interval is determined as a coefficient of the adaptive filter having a largest value.

7. The device as claimed in claim 6, wherein a delay between a far-end talker signal and the echo of the far-end talker signal is determined by a location of a tap with the largest value of the coefficient of the adaptive filter that determines the acoustic coupling.

8. A method for determining an acoustic coupling between a far-end talker signal and a combined signal that comprises an echo of the far-end talker signal and a near-end talker signal, the method comprising acts of:

provide the far-end talker signal and the combined signal to a processing device; and deriving by the processing device the acoustic coupling from a ratio of changes in an envelope of the combined signal to changes in an envelope of the far-end talker signal in a predetermined time interval, wherein the deriving includes acts of:

determining by a first changes-in-envelope determining circuit of the processing device changes in the envelope of the far-end talker signal;

determining by a second changes-in-envelope determining circuit of the processing device changes in the envelope of the combined signal;

filtering by an adaptive filter the changes in the envelope of the far-end talker signal, wherein the adaptive filter is controlled by a residual signal to adjust coefficients of the adaptive filter in such a way that an energy of the residual signal is minimized, and wherein the residual signal is provided to the adaptive filter for adjusting the coefficients of the adaptive filter; and subtracting by a subtractor a difference between an output signal of the adaptive filter and the changes in the envelope of the combined signal to determine the residual signal.

9. The method of claim 8, wherein a coefficient of the adaptive filter is the ratio of the changes in the envelope of the combined signal to the changes in the envelope of the far-end talker signal in the predetermined time interval.

10. An acoustic echo canceller comprising:

a loudspeaker for reproducing a far-end talker signal;

a microphone for picking-up a combined signal that comprises an echo of the far-end talker signal and a near-end talker signal;

a device for determining an acoustic coupling signal between the far-end talker signal and the combined signal, the device including a first filter for outputting the acoustic coupling signal;

a second filter for filtering the far-end talker signal in dependence on a difference between an output signal of the adaptive filter and changes in an envelope of the combined signal to predict the echo on the microphone caused by the loudspeaker; and wherein the device further includes: inputs for receiving the far-end talker signal and the combined signal; and circuitry for deriving the acoustic coupling from a ratio of the changes in the envelope of the combined signal to changes in an envelope of the far-end talker signal in a predetermined time interval, wherein the second filter is configured to filter the changes in the envelope of the far-end talker signal, wherein the second filter is controlled by the acoustic coupling signal and by a residual signal to adjust coefficients of the adaptive filter in such a way that an energy of the residual signal is minimized, wherein the residual signal is provided to the second filter for adjusting the coefficients of the second filter, and wherein the residual signal is determined by a subtractor, the subtractor calculating the difference between the output signal of the second filter and the changes in the envelope of the combined signal, and wherein the circuit co rises a first changes-in-envelope determining circuit for determining changes in the envelope of the far-end talker signal and a second changes-in-envelope determining circuit for determining changes in the envelope of the combined signal.

11. The acoustic echo canceller of claim 10, further comprising:

a delay circuit preceding the echo filter to delay the far-end talker signal, wherein the delay circuit is controlled by location of a tap with a largest value of the second filter that determines the acoustic coupling.

12. The acoustic echo canceller of claim 10, wherein a coefficient of the second filter is the ratio of the changes in the envelope of the combined signal to the changes in the envelope of the far-end talker signal in the predetermined time interval.

* * * * *